(12) United States Patent
Liu et al.

(10) Patent No.: US 11,320,202 B2
(45) Date of Patent: May 3, 2022

(54) HEAT PUMP DRYER

(71) Applicant: Sui Liu, Guangzhou (CN)

(72) Inventors: Sui Liu, Guangzhou (CN); Zhaohui Liu, Guangzhou (CN)

(73) Assignee: Sui Liu, Guangzhou (CN)

( * ) Notice: Subject to any disclaimer, the term of this patent is extended or adjusted under 35 U.S.C. 154(b) by 63 days.

(21) Appl. No.: 16/920,629

(22) Filed: Jul. 3, 2020

(65) Prior Publication Data

US 2021/0231369 A1    Jul. 29, 2021

Related U.S. Application Data

(63) Continuation of application No. 16/751,198, filed on Jan. 23, 2020, now Pat. No. 10,712,089.

(51) Int. Cl.
| | |
|---|---|
| *F26B 13/10* | (2006.01) |
| *F26B 21/00* | (2006.01) |
| *F26B 21/02* | (2006.01) |
| *F26B 23/10* | (2006.01) |
| *F25B 30/02* | (2006.01) |

(52) U.S. Cl.
CPC ............ *F26B 21/002* (2013.01); *F25B 30/02* (2013.01); *F26B 21/028* (2013.01); *F26B 23/10* (2013.01)

(58) Field of Classification Search
CPC .............. F28D 21/001; F28D 21/0001; F28D 21/0003; F28D 21/0014; F28D 2021/0038; F28D 1/0226; F26B 21/002; F26B 21/028; F26B 21/086; F26B 23/10; F26B 23/005; F25B 30/02; F25B 13/00; Y02B 30/52; Y02P 70/10

USPC ........................ 34/523, 513, 514; 62/DIG. 22
See application file for complete search history.

(56) References Cited

U.S. PATENT DOCUMENTS

| | | | |
|---|---|---|---|
| 4,271,899 A * | 6/1981 | Noland .................. | F02D 21/02 165/233 |
| 5,299,633 A | 4/1994 | Bruggemann | |
| 6,295,825 B1 * | 10/2001 | Jin .......................... | F25B 5/00 62/238.7 |
| 2005/0086824 A1 | 4/2005 | Ono et al. | |
| 2006/0196225 A1 | 9/2006 | Han | |

(Continued)

FOREIGN PATENT DOCUMENTS

| | | | | |
|---|---|---|---|---|
| CN | 109827421 A * | 5/2019 | ............. | F25B 41/00 |
| DE | 102016100746 A1 * | 7/2017 | ............. | D06F 58/24 |

*Primary Examiner* — John P McCormack
(74) *Attorney, Agent, or Firm* — Novoclaims Patent Services LLC; Mei Lin Wong (57) ABSTRACT

A heat pump dryer includes a main casing having an air inlet channel and an air outlet channel, a compressor, a first heat exchanger positioned in the air inlet channel, a second heat exchanger positioned in the air outlet channel, a fan provided in the air inlet channel, and an energy efficient heat exchanger. The energy efficient heat exchanger has a first portion partially exposed to the air inlet channel, and a second portion partially exposed to the air outlet channel. Air is arranged to enter the air inlet channel to sequentially perform heat exchange with the first portion of the energy efficient heat exchanger and the first heat exchanger. Air passing through the air inlet channel is arranged to enter the air outlet channel to sequentially perform heat exchange with the second portion of the energy efficient heat exchanger and the second heat exchanger.

9 Claims, 7 Drawing Sheets

(56) References Cited

U.S. PATENT DOCUMENTS

2014/0223758 A1\* 8/2014 Bison .................... D06F 58/206
 34/86
2019/0271109 A1   9/2019 Jung
2021/0094389 A1\* 4/2021 Li ...................... B60H 1/00849

\* cited by examiner

FIG.7

HEAT PUMP DRYER

CROSS REFERENCE TO RELATED APPLICATION

This is a Continuation and Divisional application of a non-provisional application having application Ser. No. 16/751,198, and filing date of Jan. 23, 2020. The entire contents of this/these application(s) is/are hereby incorporated by reference.

BACKGROUND OF THE PRESENT INVENTION

Field of Invention

The present invention relates to a dryer, and more particularly to a heat pump dryer comprising an energy efficient heat exchanger which is capable of providing heat exchange between refrigerant and air in a very energy efficient manner.

Description of Related Arts

Conventional drying technologies utilize coal, gas or other fossil fuel as energy source for generating heat to dry objects. These conventional drying technologies are usually energy inefficient and may have adverse effect to environment. Thus, heat pump drying assemblies have been developed to generate heat in a more energy efficient manner. Broadly, there exist two types of heat pump drying assemblies, namely opened-cycle heat pump dryers and closed-cycle heat pump dryers. In the former type, the smell of the objects to be dried cannot be retained. Therefore, this type of dryers may not be used for drying certain types of objects. In the latter type of dryers, the smell of the objects may be retained. However, closed-cycle heat pump dryers utilize high-power heating elements which involve substantially higher operating costs.

Chinese Patent CN 108332518 to Zhou discloses a closed-cycle heat pump dryer which comprises a heat pipe heat exchanger in which an evaporator and a condenser are separately positioned in a dryer, yet the evaporator and the condenser must work together to achieve a proper heat pump performance. As disclosed in CN 108332518, refrigerant must travel through a considerable distance for performing heat exchange in the evaporator and the condenser. This severely affects the efficiency of the entire heat pipe heat exchanger.

SUMMARY OF THE PRESENT INVENTION

An objective of the present invention is to provide a heat pump dryer comprising an energy efficient heat exchanger which is capable of providing heat exchange between refrigerant and air in a very energy efficient manner.

Another objective of the present invention is to provide a heat pump dryer which is capable of increasing a temperature of a drying compartment by absorbing heat from ambient environment.

Another objective of the present invention is to provide a heat pump dryer which is capable of decreasing a temperature of a drying compartment by releasing heat to ambient environment.

Another objective of the present invention is to provide a heat pump dryer comprising an energy efficient heat exchanger for heat exchange between refrigerant and air in a very energy efficient manner so that water can be extracted in a very energy efficient manner and then removed effectively to maintain a dry condition continuously for continuous operation on an industrial scale.

In one aspect of the present invention, it provides a heat pump dryer, comprising:

a main casing having an air inlet, an air outlet, a heat exchanging compartment, a partitioning member provided in the heat exchanging compartment to divide the heat exchanging compartment into an air inlet channel and an air outlet channel, the air inlet channel communicating with the air inlet while the air outlet channel communicating with the air outlet, the air inlet channel communicating with the air outlet channel through an air passage formed in the heat exchanging compartment;

a plurality of connecting pipes for allowing heat exchange medium to pass therethrough;

a four-way reversing valve;

a compressor having a compressor input port and a compressor output port;

a first heat exchanger connected to the compressor through at least one of the connecting pipes and the four-way reversing valve, the first heat exchanger having a first connection port and a second connection port, and is positioned in the air inlet channel; and a second heat exchanger connected to the compressor and the first heat exchanger through at least one of the connecting pipes and the four-way reversing valve, the second heat exchanger having a third connection port and a fourth connection port, and is positioned in the air outlet channel;

a fan provided in the air inlet channel; and an energy efficient heat exchanger provided in the heat exchanging compartment of the main casing, the energy efficient heat exchanger having a first portion partially exposed to the air inlet channel, and a second portion partially exposed to the air outlet channel, wherein air from a drying compartment is arranged to enter the air inlet channel through the air inlet to sequentially perform heat exchange with the first portion of the energy efficient heat exchanger and the first heat exchanger for extracting heat to the first portion of the energy efficient heat exchanger and the first heat exchanger, the air passing through the air inlet channel being arranged to enter the air outlet channel through the air passage and sequentially perform heat exchange with the second portion of the energy efficient heat exchanger and the second heat exchanger for absorbing heat from the second portion of the energy efficient heat exchanger and the second heat exchanger, the air in the air outlet channel being guided to flow out of the heat pump dryer through the air outlet, wherein a predetermined amount of refrigerant circulating in the energy efficient heat exchanger in such a manner that refrigerant circulating in the first portion is arranged to absorb heat from the air so as to become gaseous state and flow to the second portion where the refrigerant is arranged to release heat to the air and return to liquid state.

This summary presented above is provided merely to introduce certain concepts and not to identify any key or essential features of the claimed subject matter.

DETAILED DESCRIPTION OF THE PREFERRED EMBODIMENT

The following detailed description of the preferred embodiment is the preferred mode of carrying out the invention. The description is not to be taken in any limiting sense. It is presented for the purpose of illustrating the general principles of the present invention.

Figure 1:
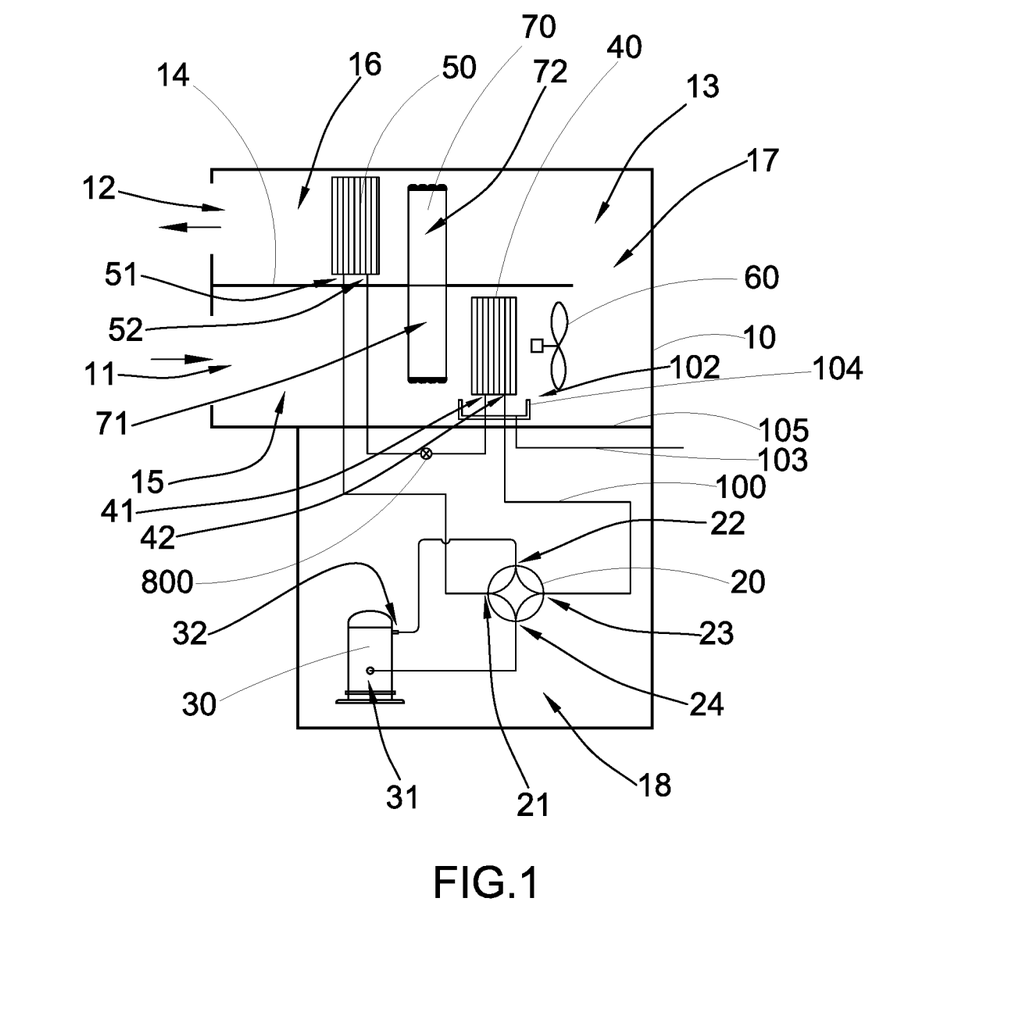
FIG. 1 is a schematic diagram of a heat pump dryer according to a preferred embodiment of the present invention.
Figure 2:
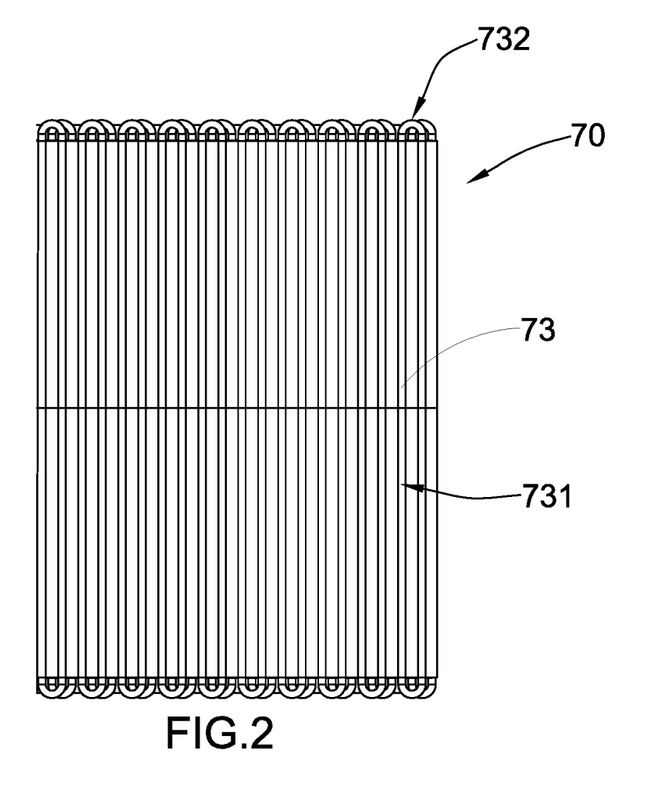
FIG. 2 is a schematic diagram of energy efficient heat exchanger of the heat pump dryer according to the preferred embodiment of the present invention.

Referring to FIG. 1 to FIG. 2 of the drawings, a heat pump dryer according to a preferred embodiment of the present invention is illustrated. Broadly, the heat pump dryer comprises a plurality of connecting pipes 100, a main casing 10, a four-way reversing valve 20, a compressor 30, a first heat exchanger 40, a second heat exchanger 50, a fan 60, and an energy efficient heat exchanger 70. The plurality of connecting pipes 100 are for allowing heat exchange medium to pass therethrough, so that heat exchange medium, such as refrigerant or water may pass through the elements of the heat pump dryer. In the description below, the connections between various elements of the heat pump dryer are carried out by at least one connecting pipe 100.

According to the preferred embodiment of the present invention, the heat pump dryer is utilized to dry certain objects placed in a designated space such as a drying compartment. A predetermined of heat exchange medium, such as refrigerant, is guided to pass through the connecting pipes 100 so as to extract and retrieve heat from another heat exchange medium, such as refrigerant or water.

The main casing 10 has an air inlet 11, an air outlet 12, a heat exchanging compartment 13, a partitioning member 14 provided in the heat exchanging compartment 13 to divide the heat exchanging compartment 13 into an air inlet channel 15 and an air outlet channel 16. The air inlet channel 15 communicates with the air inlet 11 while the air outlet channel 16 communicates with the air outlet 12. The air inlet channel 15 communicates with the air outlet channel 16 through an air passage 17 formed in the heat exchanging compartment 13.

The compressor 30 has a compressor input port 31 and a compressor output port 32.

The first heat exchanger 40 is connected to the compressor 30 through at least one of the connecting pipes 100 and the four-way reversing valve 20. The first heat exchanger 40 has a first connection port 41 and a second connection port 42, and is positioned in the air inlet channel 15.

The second heat exchanger 50 is connected to the compressor 30 and the first heat exchanger 40 through at least one of the connecting pipes 100 and the four-way reversing valve 20. The second heat exchanger 50 has a third connection port 51 and a fourth connection port 52, and is positioned in the air outlet channel 16.

The fan 60 is provided in the air inlet channel 15 for drawing air to circulate through the main casing 10.

The energy efficient heat exchanger 70 is provided in the heat exchanging compartment 13 of the main casing 10. The energy efficient heat exchanger 70 has a first portion 71 partially exposed to the air inlet channel 15, and a second portion 72 partially exposed to the air outlet channel 16.

Air from a drying compartment is arranged to enter the air inlet channel 15 through the air inlet 11 to sequentially perform heat exchange with the first portion 71 of the energy efficient heat exchanger 70 and the first heat exchanger 40 for extracting heat to the first portion 71 of the energy efficient heat exchanger 70 and the first heat exchanger 40. The air passing through the air inlet channel 15 is guided to enter the air outlet channel 16 through the air passage 17 and sequentially perform heat exchange with the second portion 72 of the energy efficient heat exchanger 70 and the second heat exchanger 50 for absorbing heat from the second portion 72 of the energy efficient heat exchanger 70 and the second heat exchanger 50. The air in the air outlet channel 16 is guided to flow out of the heat pump dryer through the air outlet 12.

At the same time, a predetermined amount of refrigerant circulating in the energy efficient heat exchanger 70 in such a manner that refrigerant circulating in the first portion 71 is arranged to absorb heat from the air so as to become gaseous state and naturally flow to the second portion 72 where the refrigerant is arranged to release heat to the air and return to liquid state and naturally flow back to the first portion 71.

According to the preferred embodiment of the present invention, the main casing 10 further has a receiving compartment 18 for receiving the compressor 30 and the four-way reversing valve 20. In this preferred embodiment, the heat exchanging compartment 13 and the receiving compartment 18 are arranged in a top-down configuration in which the heat exchanging compartment 13 is provided above the receiving compartment 18. However, one skilled in the art must appreciate that other configurations are also possible, such as a side-by-side configuration in which the heat exchanging compartment 13 may be provided on one side of the receiving compartment 18.

As shown in FIG. 1 of the drawings, the first heat exchanger 40, the second heat exchanger 50, the fan 60, and the energy efficient heat exchanger 70 are received in the heat exchanging compartment 13, while the compressor 30 and the four-way reversing valve 20 are received in the receiving compartment 18. The air inlet channel 15 and the air outlet channel 16 are formed in the heat exchanging compartment 13 of the main casing 10 in a up-down configuration.

The four-way reversing valve 20 may have first through fourth communicative port 21, 22, 23, 24. In this preferred embodiment of the present invention, the first communicative port 21 selectively communicates with the second communicative port 22 while the third communicative port 23 selectively communicates with the fourth communicative port 24. The four-way reversing valve 20 may also be switched such that first communicative port 21 selectively communicates with the fourth communicative port 24 while the second communicative port 22 selectively communicates with the third communicative port 23.

According to the preferred embodiment of the present invention, the compressor output port 32 of the compressor 30 is connected to the second communicative port 22, while the compressor input port 31 of the compressor 30 is connected to the fourth communicative port 24 of the four-way reversing valve 20.

The first connection port 41 of the first heat exchanger 40 is connected to the fourth connection port 52 of the second heat exchanger 50, preferably through a flow regulator 800. The second connection port 42 of the first heat exchanger 40 is connected to the third communicative port 23 of the four-way reversing valve 20. As shown in FIG. 1 of the drawings, the first heat exchanger 40 is positioned in the air inlet channel 15 in such a manner that incoming air from the air inlet 11 is arranged to first pass through the first portion 71 of the energy efficient heat exchanger 70 before reaching the first heat exchanger 40.

The third connection port 51 of the second heat exchanger 50 is connected to the first communicative port 21 of the four-way reversing valve 20, while the fourth connection port 52 of the second heat exchanger 50 is connected to the first connection port 41 of the first heat exchanger 40. The second heat exchanger 50 is positioned in the air outlet channel 16 in such a manner that air coming from the air inlet channel 15 is arranged to first pass through the second portion 72 of the energy efficient heat exchanger 70 before reaching the second heat exchanger 50.

Referring to FIG. 2 of the drawings, the energy efficient heat exchanger 70 comprises a heat exchanging tube 73 bent to form a manifold structure. Thus, the heat exchanging tube 73 has a plurality of extension portions 731 and a plurality of connecting portions 732, wherein each of the connecting portions 732 connects each two adjacent extension portions 731. In this preferred embodiment, each of the extension portions 731 vertically extends in the heat exchanging compartment 13 while the connecting portions 732 extend to connect two corresponding extension portions 731.

With the above configuration, the energy efficient heat exchanger 70 is positioned in the heat exchanging compartment 13 such that a longitudinal direction of the energy efficient heat exchanger 70 is in a vertical orientation. This ensures that refrigerant flowing in the energy efficient heat exchanger 70 is guided to flow in a vertical orientation.

The operation of the present invention is as follows: the refrigerant flowing cycle may start from the compressor output port 32 of the compressor 30. Heated refrigerant is guided to leave the compressor 30 through the compressor outlet port 32 and flow through the second communicative port 22 of the four-way reversing valve 20, the first communicative port 21 of the four-way reversing valve 20, and enter the second heat exchanger 50 through the third connection port 51. The refrigerant is arranged to release heat to the air flowing in the air outlet channel 16 for producing high-temperature and low-humidity air which is to be discharged to the drying compartment (not shown) through the air outlet 12.

The refrigerant in the second heat exchanger 50 is arranged to leave the second heat exchanger 50 through the fourth connection port 52 and enter the first heat exchanger 40 through the first connection port 41. The refrigerant in the first heat exchanger 40 is arranged to absorb heat to the air flowing in the air inlet channel 15. Water contained in the air flowing in the air inlet channel 15 will be condensed and removed from the air flow. The air flowing through the air inlet channel 15 will therefore have low humidity.

The refrigerant may then be guided to leave the first heat exchanger 40 through the second connection port 42. The refrigerant leaving the first heat exchanger 40 will be guided to pass through the third communicative port 23 and the fourth communicative port 24 of the four-way reversing valve 20 and eventually go back to the compressor 30 through the compressor input port 31.

On the other hand, the energy efficient heat exchanger 70 has a closed-loop circulation of refrigerant flowing through the first portion 71 and the second portion 72. The first portion 71 is positioned underneath the second portion 72 so that refrigerant in gaseous state will naturally flow upwardly along the energy efficient heat exchanger 70 while the refrigerant in liquid state will naturally flow downwardly along the energy efficient heat exchanger 70.

More specifically, the refrigerant in its liquid state is arranged to flow in the first portion 71 of the energy efficient heat exchanger 70. When air flows through the air inlet channel 15, the refrigerant flowing through the first portion 71 is arranged to absorb heat from the air so as to condense water content therein (i.e. water removal from the incoming air). The refrigerant will then turn into gaseous state and upwardly flow toward the second portion 72 which is positioned above the first portion 71.

The refrigerant flowing to the second portion 72 will be arranged to release heat to the air flowing in the air outlet channel 16 so as to increase the temperature of the air flowing out of the air outlet channel 16. The outgoing air will have low humidity and high temperature suitable for drying a wide range of objects.

It is worth mentioning that the flowing of refrigerant in the energy efficient heat exchanger 70 does not need additional energy source. Refrigerant in its gaseous state will flow upwardly due to inherent physical properties. On the other hand, refrigerant in its liquid state will move down the heat exchanging tube 73 also due to inherent physical properties. The refrigerant circulating in the energy efficient heat exchanger 70 may be conventional R134a, R410A, R1234yf, R1234ze or carbon dioxide.

The heat pump dryer further comprises a residual water discharge arrangement 102 arranged to divert residual water formed on an external surface of the first heat exchanger 40. The residual water discharge arrangement 102 comprises at least one of a guiding tube 103 and a residual water collection basin 104. The residual water collection basin 104 may be positioned under the first heat exchanger 40 so as to collect residual water dropped thereto. The guiding tube 103 may be connected to the residual water collection basin 104 for diverting residual water out of the main casing 10. If no residual water collection basin 104 is used, the guiding tube 103 may be directly connected to the main casing 10 so that residual water falling to a supporting boundary 105 of the air inlet channel 15 underneath first heat exchanger 40 will be discharged out of the main casing 10 through the guiding tube 103. The residual water discharge arrangement 102 is used to remove condensed water formed on the first heat exchanger 40 so as to maintain a dry condition in the air inlet channel 15.

Figure 3:
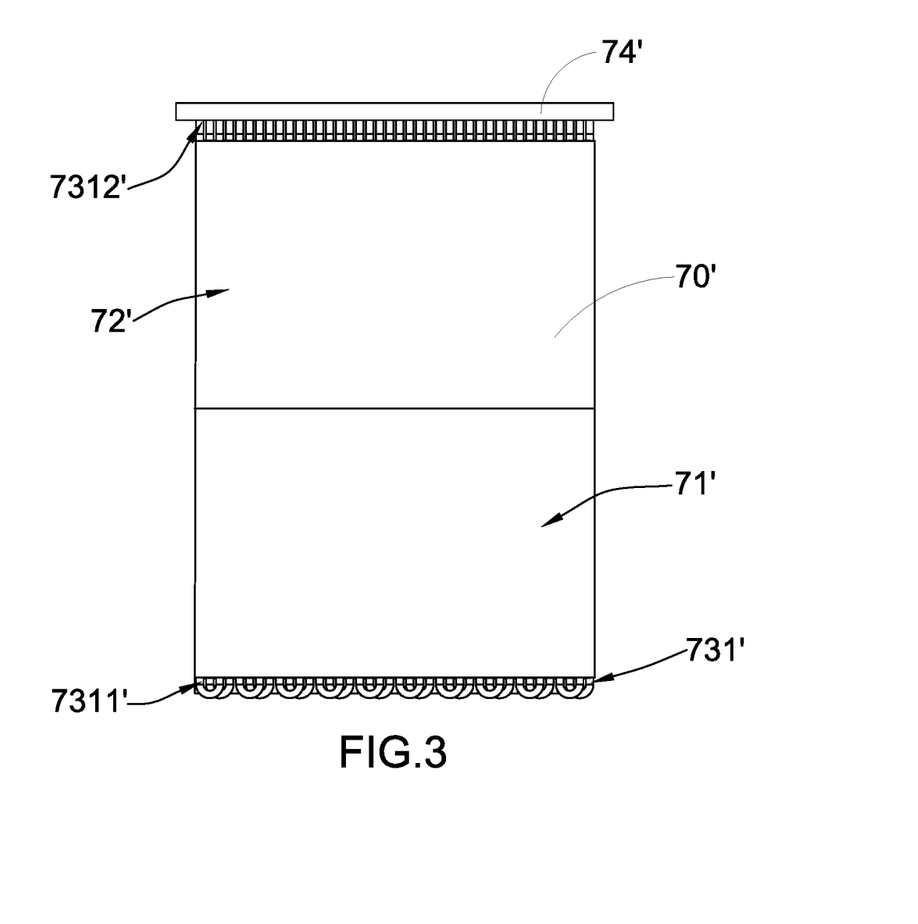
FIG. 3 is a first alternative mode of the heat pump dryer according to the preferred embodiment of the present invention, illustrating a different configuration of the energy efficient heat exchanger.

Referring to FIG. 3 of the drawings, a first alternative mode of the heat pump dryer according to the preferred embodiment of the present invention is illustrated. The first alternative mode is similar to the preferred embodiment disclosed above, except the energy efficient heat exchanger 70'. According to the first alternative mode, the energy efficient heat exchanger 70' comprises a heat exchanging tube 73' bent to form a manifold structure. The heat exchanging tube 73' has a plurality of extension portions 731' and a plurality of connecting portions 732', wherein each of the connecting portions 732' connects each two adjacent extension portions 731'. In this first alternative mode, each of the extension portions 731' vertically extends in the heat exchanging compartment 13 while the connecting portions 732' extend to connect two corresponding extension portions 731' in the first portion 71' of the energy efficient heat exchanger 70'.

Moreover, the energy efficient heat exchanger 70' further comprises a refrigerant collection pipe 74' provided on the second portion 72' and extend across a transverse direction of the energy efficient heat exchanger 70' for collecting gaseous refrigerant flowing from the extension portions 731' of the heat exchanging tube 73'.

Thus, the connecting portions 732' are provided at the first portion 71' of the energy efficient heat exchanger 70' for connecting lower ends 7311' of the corresponding extension portions 731' while the refrigerant collection pipe 74' is provided at the second portion 72' of the energy efficient heat exchanger 70' for connecting upper ends 7312' of the corresponding extension portions 731'.

Figure 4:
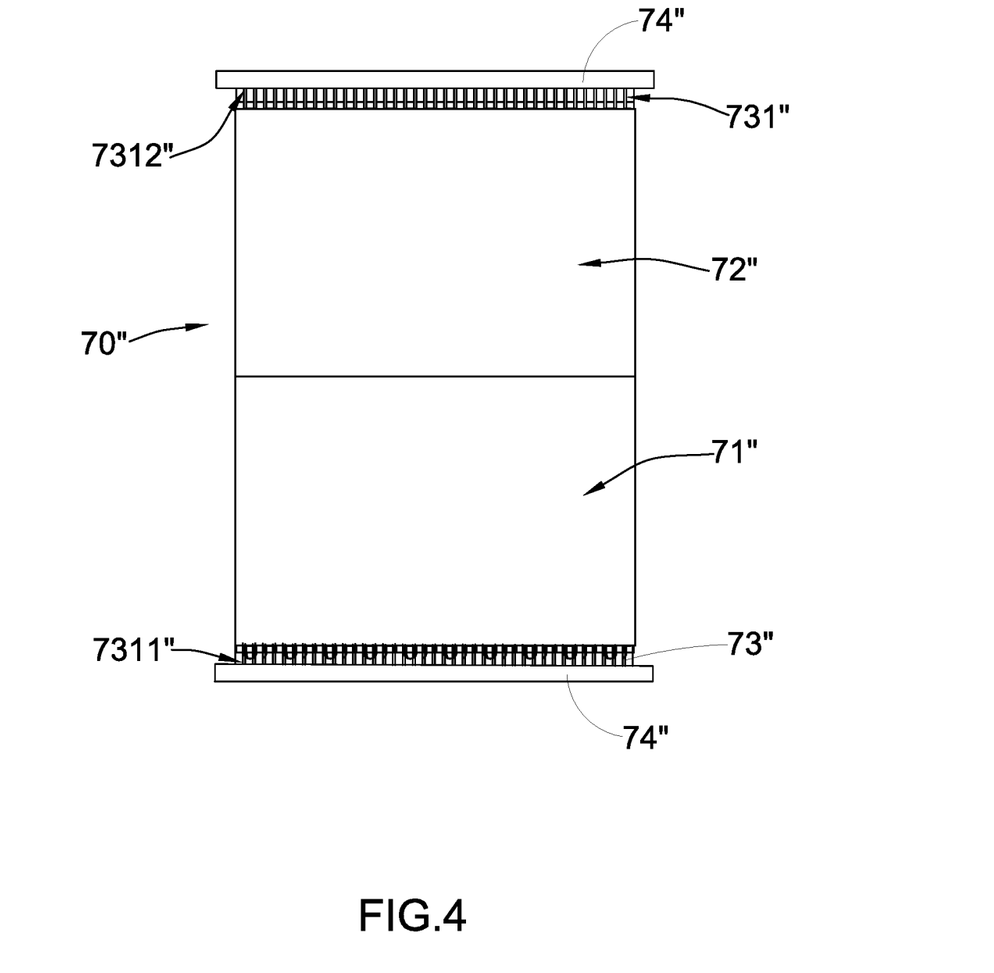
FIG. 4 is a second alternative mode of the heat pump dryer according to the preferred embodiment of the present invention, illustrating another configuration of the energy efficient heat exchanger.

Referring to FIG. 4 of the drawings, a second alternative mode of the heat pump dryer according to the preferred embodiment of the present invention is illustrated. The second alternative mode is similar to the preferred embodiment disclosed above, except the energy efficient heat exchanger 70". According to the second alternative mode, the energy efficient heat exchanger 70" comprises a heat exchanging tube 73" bent to form a manifold structure. The heat exchanging tube 73" has a plurality of extension portions 731" vertically extended in the heat exchanging compartment 13. The energy efficient heat exchanger 70" further comprises a plurality of refrigerant collection pipes 74" extended on the first portion 71" and the second portion 72" and extend across a transverse direction of the energy efficient heat exchanger 70" for collecting refrigerant flowing from the extension portions 731" of the heat exchanging tube 73".

Thus, the refrigerant collection pipes 74" are provided on upper ends 7312" and lower ends 7311" of the extension portions 731" so that refrigerant flowing through the extension portions 731" will be collected in the corresponding refrigerant collection pipes 74". Refrigerant in the gaseous state is arranged to be collected in the refrigerant collection pipes 74" at the upper ends 7312" of the extension portions 731", while refrigerant in the liquid state is arranged to be collected in the refrigerant collection pipes 74" at the lower ends 7311" of the extension portions 731".

Figure 5:
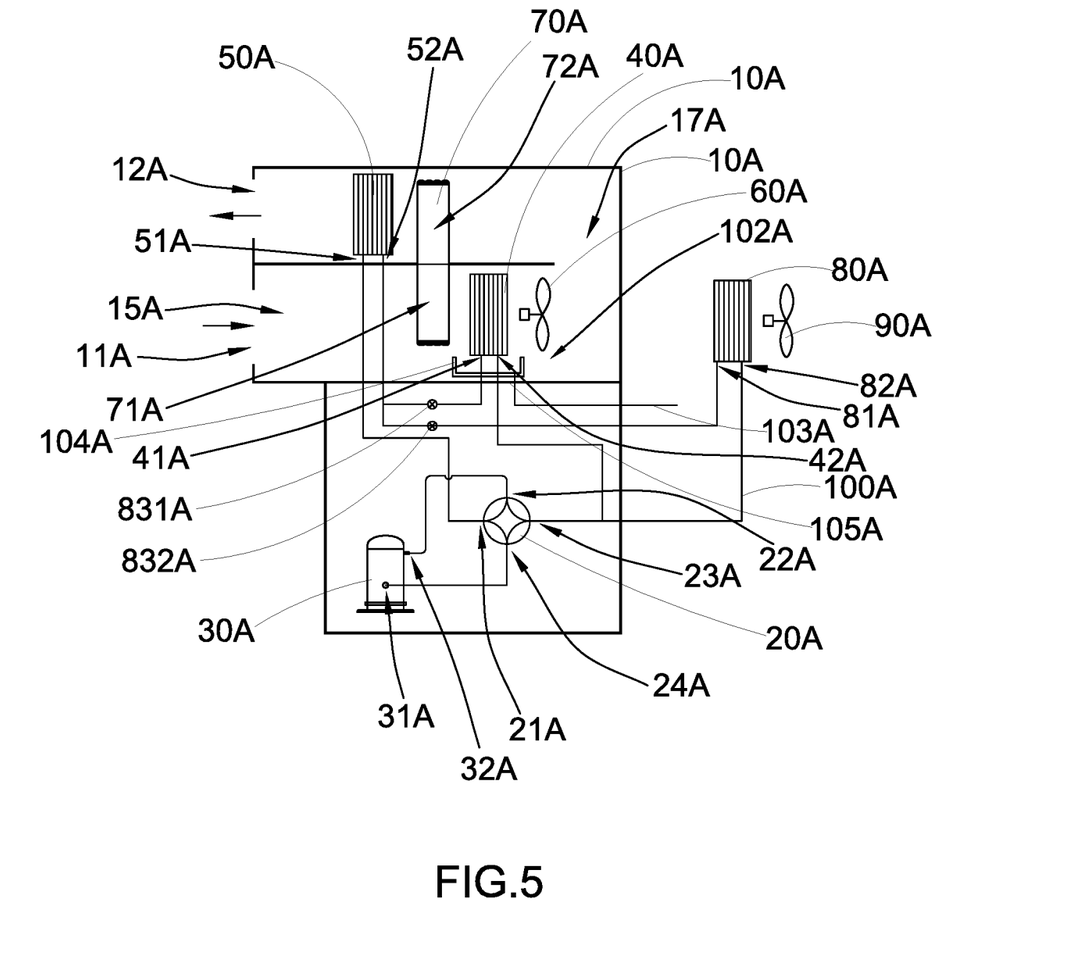
FIG. 5 is a third alternative mode of the heat pump dryer according to the preferred embodiment of the present invention.

Referring to FIG. 5 of the drawings, a third alternative mode of the heat pump dryer according to the preferred embodiment of the present invention is illustrated. The third alternative mode is similar to the preferred embodiment disclosed above, except the connection between the components of the heat pump dryer. According to the third alternative mode, the heat pump dryer further comprises an auxiliary heat exchanger 80A and an auxiliary fan 90A provided in the vicinity of the auxiliary heat exchanger 80A for supplying ambient air to the auxiliary heat exchanger 80A. The connection between various elements of the heat pump dryer is through connecting pipes 100A.

The auxiliary heat exchanger 80A has a fifth connection port 81A and a sixth connection port 82A and is primarily used as an evaporator for absorbing additional heat from ambient environment. The purpose of the auxiliary heat exchanger 80A is to allow additional heat to be rapidly supplied to the heat pump dryer so as to allow faster generation of heat thereof. The result is that the heat pump dryer may be able to provide high-temperature and low-humidity air in a more rapid manner.

According to the third alternative mode, the compressor output port 32A of the compressor 30A is connected to the second communicative port 22A, while the compressor input port 31A of the compressor 30A is connected to the fourth communicative port 24A of the four-way reversing valve 20A.

The first connection port 41A of the first heat exchanger 40A is connected to the fourth connection port 52A of the second heat exchanger 50A and the fifth connection port 81A of the auxiliary heat exchanger 80A in a parallel configuration. The second connection port 42A of the first heat exchanger 40A is connected to the third communicative port 23A of the four-way reversing valve 20A and the sixth connection port 82A of the auxiliary heat exchanger 80A.

As shown in FIG. 5 of the drawings, the first heat exchanger 40A is positioned in the air inlet channel 15A in such a manner that incoming air from the air inlet 11A is arranged to first pass through the first portion 71A of the energy efficient heat exchanger 70A before reaching the first heat exchanger 40A.

The third connection port 51A of the second heat exchanger 50A is connected to the first communicative port 21A of the four-way reversing valve 20A, while the fourth connection port 52A of the second heat exchanger 50A is connected to the first connection port 41A of the first heat exchanger 40A and the fifth connection port 81A of the auxiliary heat exchanger 80A. The second heat exchanger 50A is positioned in the air outlet channel 16A in such a manner that air coming from the air inlet channel 15A is arranged to first pass through the second portion 72A of the energy efficient heat exchanger 70 before reaching the second heat exchanger 50A.

The heat pump dryer further comprises a first flow regulators 831A and a second flow regulator 832A, wherein the first flow regulator 831A is arranged to connect between the fourth connection port 52A and the first connection port 41A, while the second flow regulator 832A is connected between the fourth connection port 52A and the fifth connection port 81A of the auxiliary heat exchanger 80A.

The structure of the energy efficient heat exchanger 70A is identical to what is disclosed in the preferred embodiment above.

The energy efficient heat exchanger 70 is also positioned in the heat exchanging compartment 13 such that a longitudinal direction of the energy efficient heat exchanger 70 is in a vertical orientation. This ensures that refrigerant flowing in the energy efficient heat exchanger 70 is guided to flow in a vertical orientation.

The operation of the third alternative mode is as follows: (drying mode) the refrigerant cycle may start from the compressor 30A. Heated refrigerant may leave the compressor 30A through the compressor output port 32A and pass through the second communicative port 22A and the first communicative port 21A of the four-way reversing valve 20A. The refrigerant will then pass through the third connection port 51A of the second heat exchanger 50A and perform heat exchange with the air flowing in the air outlet channel 16A for releasing heat thereto. The refrigerant will then be arranged to leave the second heat exchanger 50A through the fourth connection port 52A.

The refrigerant leaving the second heat exchanger 50A will be bifurcated into two streams. One stream of the refrigerant is guided to pass through the first flow regulator 831A and enter the first heat exchanger 40A through the first connection port 41A. The refrigerant entering the first heat exchanger 40A is arranged to perform heat exchange with the air flowing in the air inlet channel 15A for absorbing heat therefrom. Since heat is extracted from the air flowing in the air inlet channel 15A, water will be removed from the air flowing in the air inlet channel 15A. Dried air will leave the heat pump dryer through the air outlet 12A.

Another stream of the refrigerant leaving the second heat exchanger 50A will be guided to pass through the second flow regulator 832A and enter the auxiliary heat exchanger 80A through the fifth connection port 81A. The refrigerant entering the auxiliary heat exchanger 80A is arranged to absorb heat from ambient air because the auxiliary heat exchanger 80A is positioned in ambient environment. The refrigerant leaving the auxiliary heat exchanger 80A is guided to merge with the stream of the refrigerant leaving from the first heat exchanger 40A to form one single stream of refrigerant. This single stream of refrigerant will then be guided to pass through the third communicative port 23A and the fourth communicative port 24A of the four-way reversing valve 20A and eventually go back to the compressor 30A through the compressor input port 31A.

It is worth mentioning that the flow regulators 831A, 832A are arranged to control the amount of refrigerant flowing to the first heat exchanger 40A and the auxiliary heat exchanger 80A respectively. Thus, by controlling the flow regulators 831A, 832A, a user may optionally stop the operation of either the first heat exchanger 40A or the auxiliary heat exchanger 80A so as to achieve a desirable heat exchange performance.

For example, when a user of the present invention would like to increase the temperature of a drying area (heating mode), the second flow regulator 832A may be switched on while the first flow regulator 831A may be switched off so that refrigerant coming from the second heat exchanger 50A will be guided to enter only the auxiliary heat exchanger 80A for absorbing heat from ambient environment. As such, heat from the refrigerant will be released from the second heat exchanger 50A in the air outlet channel 16A without condensing heat exchange activity which would have been occurred in the first heat exchanger 40A.

As another example, when a user would like to lower the temperature of the drying compartment (cooling mode), he may switch the four-way reversing valve 20A so that the first communicative port 21A communicates with the fourth communicative port 24A while the second communicative port 22A communicates with the third communicative port 23A. The refrigerant leaving the compressor 30A through the compressor outlet port 32A will be guided to pass through the second communicative port 22A and the third communicative port 23A of the four-way reversing valve 20A, and reach the auxiliary heat exchanger 80A through the sixth connection port 82A for releasing heat to the ambient environment. Some of the refrigerant will also reach the first heat exchanger 40A through the second connection port 42A.

The refrigerant leaving the auxiliary heat exchanger 80A and the first heat exchanger 40A will be guided to enter the second heat exchanger 50A through the fourth connection port 52A for absorbing heat from the air flowing in the air outlet channel 16A so that the air flowing to the drying compartment will have lower temperature. The fan 60A is provided in the air inlet channel 15A for drawing air to flow from the air inlet channel 15A to the air outlet channel 16A and through the air passage 17A.

The heat pump dryer further comprises a residual water discharge arrangement 102A arranged to divert residual water formed on an external surface of the first heat exchanger 40A. The residual water discharge arrangement 102A comprises at least one of a guiding tube 103A and a residual water collection basin 104A. The residual water collection basin 104A may be positioned under the first heat exchanger 40A so as to collect residual water dropped thereto. The guiding tube 103A may be connected to the residual water collection basin 104A for diverting residual water out of the main casing 10A. If no residual water collection basin 104A is used, the guiding tube 103A may be directly connected to the main casing 10A so that residual water falling to a supporting boundary 105A of the air inlet channel 15A underneath first heat exchanger 40A will be discharged out of the main casing 10A through the guiding tube 103A. The residual water discharge arrangement 102A is used to remove condensed water formed on the first heat exchanger 40A so as to maintain a dry condition in the air inlet channel 15A.

Figure 6:
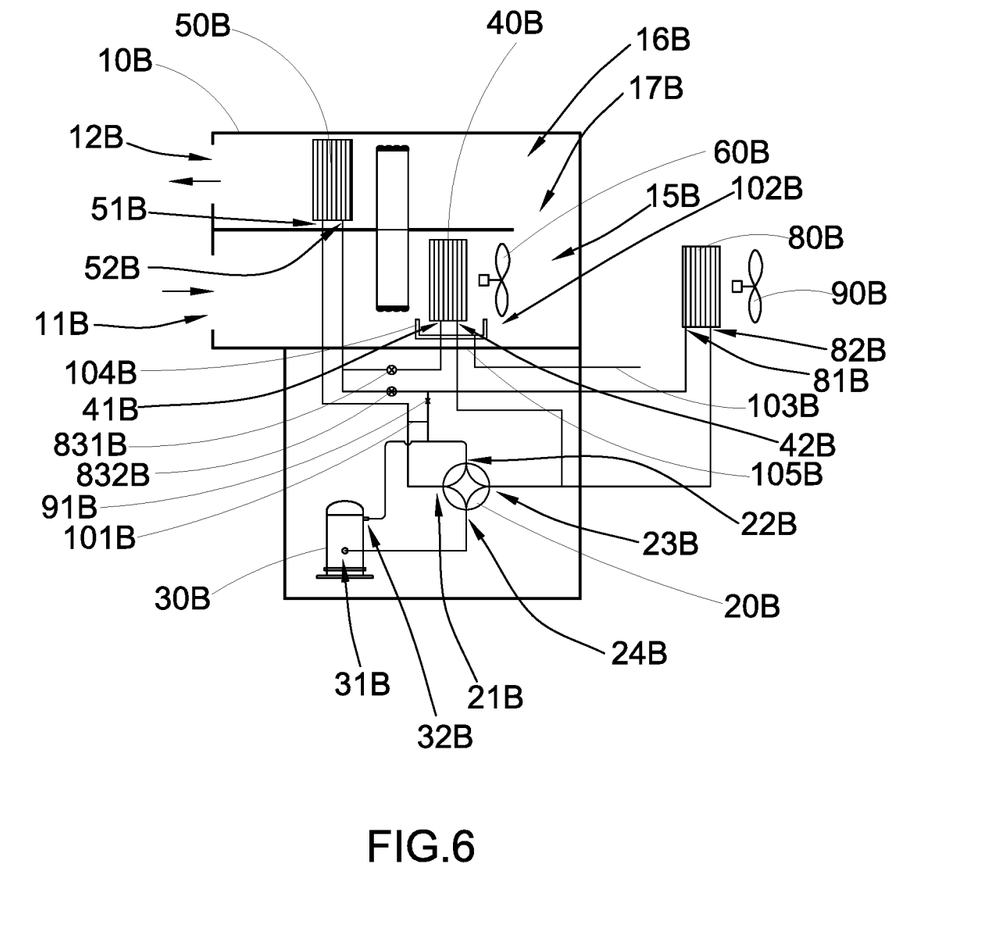
FIG. 6 is a fourth alternative mode of the heat pump dryer according to the preferred embodiment of the present invention.

Referring to FIG. 6 of the drawings, a fourth alternative mode of the heat pump dryer according to the preferred embodiment of the present invention is illustrated. The fourth alternative mode is similar to the third alternative mode disclosed above, except the third connection port 51B of the second heat exchanger 50B is also connected to the second communicative port 22B of the four-way reversing valve 20B and the compressor output port 32B of the compressor 30B through an additional branch 101B of connecting pipes 100B.

Moreover, the heat pump dryer further comprises an electromagnetic valve 91B connected to the additional branch 101B and the fourth connection port 52B of the second heat exchanger 50B and the fifth connection port 81B of the auxiliary heat exchanger 80B.

In this fourth alternative mode, the heat pump dryer may be operated to provide dried air to the drying compartment, increase the temperature of the drying compartment (for pre-heating thereof), or lower the temperature of the drying compartment.

In the normal mode of operation (drying mode), the heat pump dryer is arranged to provide dried air to the drying compartment for drying the objects disposed therein. The refrigerant cycle starts from the compressor 30B. The electromagnetic valve 91B is turned off. The first flow regulator 831B is turned opened so as to allow fluid to pass therethrough, while the second flow regulator 832B is closed to restrict fluid flow.

Heated refrigerant leaves the compressor 30B through the compressor output port 32B. The heated refrigerant is guided to pass through the second communicative port 22B, the first communicative port 21B, and enter the second heat exchanger 50B through the third connection port 51B for releasing heat to the air flowing in the air outlet channel 16B. The refrigerant is then arranged to leave the second heat exchanger 50B through the fourth connection port 52B. The refrigerant is then arranged to pass through the first flow regulator 831B and enter the first heat exchanger 40B through the first connection port 41B. The refrigerant circulating in the first heat exchanger 40B is then arranged to absorb heat from the air flowing in the air inlet channel 15B so as to remove water in the incoming air. The refrigerant is then arranged to leave the first heat exchanger 40B through the second connection port 42B and pass through the third communicative port 23B and the fourth communicative port 24B of the four-way reversing valve 20B and eventually go back to the compressor 30B through the compressor input port 31B. Air is drawn to move from the air inlet channel 15B to the air outlet channel 16B by the fan 60B and through the air passage 17B.

When the user would like to increase the temperature of the drying compartment (heating mode), the first flow regulator 831B and the second flow regulator 832B are selectively opened. Heated refrigerant leaves the compressor 30B through the compressor output port 32B. The heated refrigerant is guided to pass through the second communicative port 22B, the first communicative port 21B, and enter the second heat exchanger 50B through the third connection port 51B for releasing heat to the air flowing in the air outlet channel 16B. The refrigerant is then arranged to leave the second heat exchanger 50B through the fourth connection port 52B.

The refrigerant leaving the second heat exchanger 50B will be bifurcated into two streams. The first stream is arranged to pass through the first flow regulator 831B and enter the first heat exchanger 40B through the first connection port 41B. The refrigerant circulating in the first heat exchanger 40B is then arranged to absorb heat from the air flowing in the air inlet channel 15B so as to remove water in the incoming air.

On the other hand, another stream of the refrigerant from the second heat exchanger 50B is guided to pass through second flow regulator 832B and enter the auxiliary heat exchanger 80B through the fifth connection port 81B. The refrigerant may then absorb heat from ambient environment and leave the auxiliary heat exchanger 80B through the sixth connection port 82B. The auxiliary fan 90B is arranged to draw air to the auxiliary heat exchanger 80B.

The refrigerant streams leaving the first heat exchanger 40B and the auxiliary heat exchanger 80B respectively are arranged to merge again to form a single stream which is then guided to pass through the third communicative port 23B and the fourth communicative port 24B of the four-way reversing valve 20B and eventually go back to the compressor 30B through the compressor input port 31B.

It is worth mentioning that the flow regulators 831B, 832B are arranged to control the amount of refrigerant flowing to the first heat exchanger 40B and the auxiliary heat exchanger 80B respectively. Thus, by controlling the flow regulators 831B, 832B, a user may optionally stop the operation of either the first heat exchanger 40B or the auxiliary heat exchanger 80B so as to achieve a desirable heat exchange performance.

For example, when a user of the present invention would like to increase the temperature of a drying area (such as pre-heating), the second flow regulator 832B may be switched on while the first flow regulator 831B may be switched off so that refrigerant coming from the second heat exchanger 50B will be guided to enter only the auxiliary heat exchanger 80B for absorbing heat from ambient environment. As such, heat from the refrigerant will be released from the second heat exchanger 50B in the air outlet channel 16B without condensing heat exchange activity which would have been occurred in the first heat exchanger 40B.

When the user would like to lower the temperature of the drying compartment (cooling mode), the first flow regulator 831B and the electromagnetic valve 91B are opened while the second flow regulator 832B is closed. Heated refrigerant leaves the compressor 30B through the compressor output port 32B. The heated refrigerant is guided to pass through the second communicative port 22B and the first communicative port 21B. After that, the heated refrigerant will be bifurcated into two streams. One of the refrigerant streams is guided to pass through the additional branch 101B of the connection pipe 100B, the electromagnetic valve 91B, and enter the auxiliary heat exchanger 80B through the fifth connection port 81B for releasing heat to ambient air. Cooled refrigerant is then guided to leave the auxiliary heat exchanger 80B through the sixth connection port 82B.

On the other hand, the second stream of the heated refrigerant from the compressor 30B is guided to enter the second heat exchanger 50B through the third connection port 51B for releasing heat to the air flowing in the air outlet channel 16B. The refrigerant is then arranged to leave the second heat exchanger 50B through the fourth connection port 52B. The refrigerant leaving the second heat exchanger 50B is arranged to pass through the first flow regulator 831B and enter the first heat exchanger 40B through the first connection port 41B. The refrigerant circulating in the first heat exchanger 40B is then arranged to absorb heat from the air flowing in the air inlet channel 15B. The refrigerant is then arranged to leave the first heat exchanger 40B through the second connection port 42B.

The refrigerant streams leaving the first heat exchanger 40B and the auxiliary heat exchanger 80B respectively are arranged to merge again to form a single stream which is then guided to pass through the third communicative port 23B and the fourth communicative port 24B of the four-way reversing valve 20B and eventually go back to the compressor 30B through the compressor input port 31B to complete a refrigerant cycle. Note that all components of the heat pump dryer are mounted in a casing 10B having the air inlet 11B and the air outlet 12B.

The heat pump dryer further comprises a residual water discharge arrangement 102B arranged to divert residual water formed on an external surface of the first heat exchanger 40B. The residual water discharge arrangement 102B comprises at least one of a guiding tube 103B and a residual water collection basin 104B. The residual water collection basin 104B may be positioned under the first heat exchanger 40B so as to collect residual water dropped thereto. The guiding tube 103B may be connected to the residual water collection basin 104B for diverting residual water out of the main casing 10B. If no residual water collection basin 104B is used, the guiding tube 103B may be directly connected to the main casing 10B so that residual water falling to a supporting boundary 105B of the air inlet channel 15B underneath first heat exchanger 40B will be discharged out of the main casing 10B through the guiding tube 103B. The residual water discharge arrangement 102B is used to remove condensed water formed on the first heat exchanger 40B so as to maintain a dry condition in the air inlet channel 15B.

Figure 7:
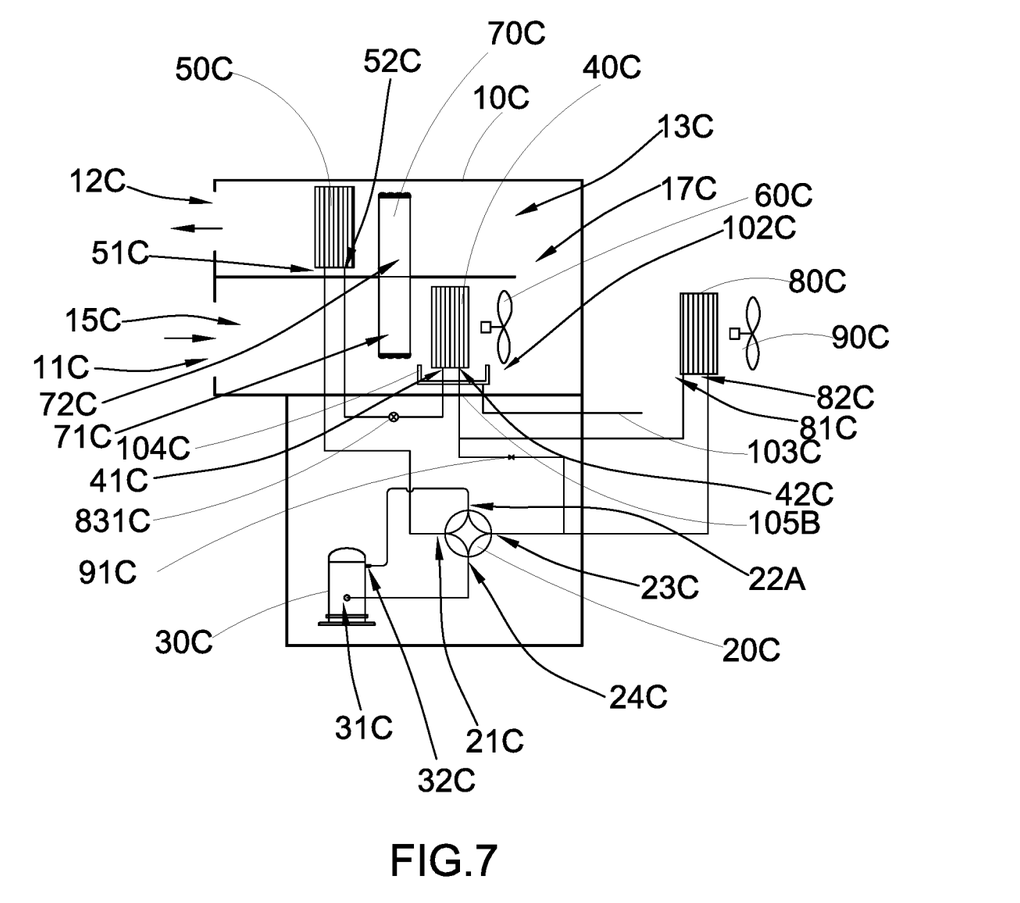
FIG. 7 is a fifth alternative mode of the heat pump dryer according to the preferred embodiment of the present invention.

Referring to FIG. 7 of the drawings, a fifth alternative mode of the heat pump dryer according to the preferred embodiment of the present invention is illustrated. The fifth alternative mode is similar to the preferred embodiment disclosed above, except the followings.

In the fifth alternative mode, the heat pump dryer further comprises an auxiliary heat exchanger 80C and an auxiliary fan 90C provided in the vicinity of the auxiliary heat exchanger 80C for supplying ambient air to the auxiliary heat exchanger 80C. All components of the are mounted in the main casing 10C having an air inlet 11C and an air outlet 12C.

The auxiliary heat exchanger 80C has a fifth connection port 81C and a sixth connection port 82C and may be used as an evaporator for absorbing additional heat from ambient environment, or as a condensing for releasing heat to the ambient environment.

According to the fifth alternative mode, the compressor output port 32C of the compressor 30C is connected to the second communicative port 22C, while the compressor input port 31C of the compressor 30C is connected to the fourth communicative port 24C of the four-way reversing valve 20C.

The first connection port 41C of the first heat exchanger 40C is connected to the fourth connection port 52C of the second heat exchanger 50C. The second connection port 42C of the first heat exchanger 40C is connected to the third communicative port 23C of the four-way reversing valve 20C through an electromagnetic valve 91C, and the fifth connection port 81C of the auxiliary heat exchanger 80C in a parallel configuration. The sixth connection port 82C of the auxiliary heat exchanger 80C is also connected to the third communicative port 23C of the four-way reversing valve 20C.

As shown in FIG. 7 of the drawings, the first heat exchanger 40C is positioned in the air inlet channel 15C in such a manner that incoming air from the air inlet 11C is arranged to first pass through the first portion 71C of the energy efficient heat exchanger 70C before reaching the first heat exchanger 40C.

The third connection port 51C of the second heat exchanger 50C is connected to the first communicative port 21C of the four-way reversing valve 20C, while the fourth connection port 52C of the second heat exchanger 50C is connected to the first connection port 41C of the first heat exchanger 40C. The second heat exchanger 50C is positioned in the air outlet channel 16C in such a manner that air coming from the air inlet channel 15C is arranged to first pass through the second portion 72C of the energy efficient heat exchanger 70C before reaching the second heat exchanger 50C. The heat pump dryer further comprises a first flow regulators 831C connected between the fourth connection port 52C and the first connection port 41C.

The structure of the energy efficient heat exchanger 70C is identical to what is disclosed in the preferred embodiment above.

The energy efficient heat exchanger 70C is also positioned in the heat exchanging compartment 13C such that a longitudinal direction of the energy efficient heat exchanger 70C is in a vertical orientation. This ensures that refrigerant flowing in the energy efficient heat exchanger 70C is guided to flow in a vertical orientation. Air is drawn by the fan 60C to flow from the air inlet channel 15C to the air outlet channel 16C through the air passage 17C.

In this fifth alternative mode, the heat pump dryer may be operated to provide dried air to the drying compartment, increase the temperature of the drying compartment (for pre-heating thereof), or lower the temperature of the drying compartment.

In the normal mode of operation, the heat pump dryer is arranged to provide dried air to the drying compartment for drying the objects disposed therein. The refrigerant cycle starts from the compressor 30C. The electromagnetic valve 91C is opened. The first flow regulator 831C is opened so as to allow fluid to pass therethrough.

Heated refrigerant leaves the compressor 30C through the compressor output port 32C. The heated refrigerant is guided to pass through the second communicative port 22C, the first communicative port 21C, and enter the second heat exchanger 50C through the third connection port 51C for releasing heat to the air flowing in the air outlet channel 16C. The refrigerant is then arranged to leave the second heat exchanger 50C through the fourth connection port 52C. The refrigerant is then arranged to pass through the first flow regulator 831C and enter the first heat exchanger 40C through the first connection port 41C. The refrigerant circulating in the first heat exchanger 40C is then arranged to absorb heat from the air flowing in the air inlet channel 15C so as to remove water in the incoming air. The refrigerant is then arranged to leave the first heat exchanger 40C through the second connection port 42C and pass through the electromagnetic vale 91C, the third communicative port 23C and the fourth communicative port 24C of the four-way reversing valve 20C and eventually go back to the compressor 30C through the compressor input port 31C.

When the user would like to increase the temperature of the drying compartment, the first flow regulator 831C is selectively opened and the electromagnetic valve 91C is closed. Heated refrigerant leaves the compressor 30C through the compressor output port 32C. The heated refrigerant is guided to pass through the second communicative port 22C, the first communicative port 21C, and enter the second heat exchanger 50C through the third connection port 51C for releasing heat to the air flowing in the air outlet channel 16C. The refrigerant is then arranged to leave the second heat exchanger 50C through the fourth connection port 52C.

The refrigerant leaving the second heat exchanger 50C will be guided to enter the auxiliary heat exchanger 80C through the fifth connection port 81C. The refrigerant may then absorb heat from ambient environment and leave the auxiliary heat exchanger 80C through the sixth connection port 82C. Note that refrigerant will not pass through the electromagnetic valve 91C because it is closed.

The refrigerant leaving the auxiliary heat exchanger 80C is arranged to pass through the third communicative port 23C and the fourth communicative port 24C of the four-way reversing valve 20C and eventually go back to the compressor 30C through the compressor input port 31C. In this mode of operation, both the second heat exchanger 50B and the auxiliary heat exchanger 80C will act as evaporators while the first heat exchanger 40C will act as a condenser.

When the user would like to lower the temperature of the drying compartment, the electromagnetic valve 91C is closed and the four-way reversing valve 20C is switched so that the first communicative port 21C is connected to the fourth communicative port 24C while the second communicative port 22C is connected to the third communicative port 23C.

Heated refrigerant leaves the compressor 30C through the compressor output port 32C. The heated refrigerant is guided to pass through the second communicative port 22C and the third communicative port 23C and reach the auxiliary heat exchanger 80C through the fifth connection port 81C. Refrigerant in the auxiliary heat exchanger 80C is arranged to release heat to ambient environment. The refrigerant is then arranged to leave the auxiliary heat exchanger 80C through the sixth connection port 82C.

The refrigerant leaving the auxiliary heat exchanger 80C is guided to flow to the first heat exchanger 40C through the second connection port 42C for releasing heat to the air flowing in the air inlet channel 15C. The refrigerant is then arranged to leave the first heat exchanger 40C through the first connection port 41C, pass through the first flow regulator 831C, and enter the second heat exchanger 50C through the fourth connection port 52C for absorbing heat from the air flowing in the air outlet channel 16C. This heat exchange process will eventually decrease the temperature of the air flowing in the air outlet channel 16C and therefore decrease the temperature of the drying compartment.

The refrigerant is then guided to leave the second heat exchanger 50C through the third connection port 51C and pass through the first communicative port 21C and the fourth communicative port 24C of the four-way reversing valve 20C and go back to the compressor 30C through the compressor input port 31C.

In this mode of operation, the auxiliary heat exchanger 80C acts as a condenser for releasing heat while the first heat exchanger 40C and the second heat exchanger 50C act as condensers for absorbing heat.

The heat pump dryer further comprises a residual water discharge arrangement 102C arranged to divert residual water formed on an external surface of the first heat exchanger 40C. The residual water discharge arrangement 102C comprises at least one of a guiding tube 103C and a residual water collection basin 104C. The residual water collection basin 104C may be positioned under the first heat exchanger 40C so as to collect residual water dropped thereto. The guiding tube 103C may be connected to the residual water collection basin 104C for diverting residual water out of the main casing 10C. If no residual water collection basin 104C is used, the guiding tube 103C may be directly connected to the main casing 10C so that residual water falling to a supporting boundary 105C of the air inlet channel 15C underneath first heat exchanger 40C will be discharged out of the main casing 10C through the guiding tube 103C. The residual water discharge arrangement 102C is used to remove condensed water formed on the first heat exchanger 40C so as to maintain a dry condition in the air inlet channel 15C.

The present invention, while illustrated and described in terms of a preferred embodiment and several alternatives, is not limited to the particular description contained in this specification. Additional alternative or equivalent components could also be used to practice the present invention.

What is claimed is:

1. A heat pump dryer, comprising:
   a main casing having an air inlet, an air outlet, a heat exchanging compartment, a partitioning member provided in said heat exchanging compartment to divide said heat exchanging compartment into an air inlet channel and an air outlet channel, said air inlet channel communicating with said air inlet while said air outlet channel communicating with said air outlet, said air inlet channel communicating with said air outlet channel through an air passage formed in said heat exchanging compartment;
   a plurality of connecting pipes for allowing heat exchange medium to pass therethrough;
   a four-way reversing valve, said four-way reversing valve having first through fourth communicative ports, wherein said first communicative port selectively communicates with said second communicative port, while said third communicative port selectively communicating with said fourth communicative port;
   a compressor having a compressor input port and a compressor output port;
   a first heat exchanger connected to said compressor through at least one of said connecting pipes and said four-way reversing valve, said first heat exchanger having a first connection port and a second connection port, and is positioned in said air inlet channel; and
   a second heat exchanger connected to said compressor and said first heat exchanger through at least one of said connecting pipes and said four-way reversing valve, said second heat exchanger having a third connection port and a fourth connection port, and is positioned in said air outlet channel;
   a fan provided in said air inlet channel;
   an energy efficient heat exchanger provided in said heat exchanging compartment of said main casing, said energy efficient heat exchanger having a first portion partially exposed to said air inlet channel, and a second portion partially exposed to said air outlet channel; and
   a residual water discharge arrangement arranged to divert residual water formed on an external surface of the first heat exchanger, said residual water discharge arrangement comprising at least one of a guiding tube connected to a supporting boundary of said air inlet channel, and a residual water collection basin positioned under the first heat exchanger for collecting residual water from said first heat exchanger,
   wherein air from a drying compartment is arranged to enter said air inlet channel through said air inlet to sequentially perform heat exchange with said first portion of said energy efficient heat exchanger and said first heat exchanger for extracting heat to said first portion of said energy efficient heat exchanger and said first heat exchanger, said air passing through said air inlet channel being arranged to enter said air outlet channel through said air passage and sequentially perform heat exchange with said second portion of said energy efficient heat exchanger and said second heat exchanger for absorbing heat from said second portion of said energy efficient heat exchanger and said second heat exchanger, said air in said air outlet channel being guided to flow out of said heat pump dryer through said air outlet,
   wherein a predetermined amount of refrigerant circulating in said energy efficient heat exchanger in such a manner that refrigerant circulating in said first portion is arranged to absorb heat from said air so as to become gaseous state and flow to said second portion where said refrigerant is arranged to release heat to said air and return to liquid state,
   wherein said main casing further has a receiving compartment, said heat exchanging compartment and said receiving compartment being arranged in a top-down configuration in which said heat exchanging compartment is provided above said receiving compartment, said first heat exchanger, said second heat exchanger, said fan, and said energy efficient heat exchanger being received in said heat exchanging compartment, said compressor and said four-way reversing valve being received in said receiving compartment,
   wherein said compressor output port of said compressor is connected to said second communicative port, while said compressor input port of said compressor is connected to said fourth communicative port of said four-way reversing valve,
   wherein said first connection port of said first heat exchanger is connected to said fourth connection port of said second heat exchanger, said second connection port of said first heat exchanger being connected to said third communicative port of said four-way reversing valve, said first heat exchanger being positioned in said air inlet channel in such a manner that incoming air from said air inlet is arranged to first pass through said first portion of said energy efficient heat exchanger before reaching said first heat exchanger,
   wherein said third connection port of said second heat exchanger is connected to said first communicative port of said four-way reversing valve, while said fourth connection port of said second heat exchanger being connected to said first connection port of said first heat exchanger, said second heat exchanger being positioned in said air outlet channel in such a manner that air coming from said air inlet channel is arranged to first pass through said second portion of said energy efficient heat exchanger before reaching said second heat exchanger, wherein said energy efficient heat exchanger comprises a refrigerant collection pipe, and a heat exchanging tube bent to form a manifold structure, said heat exchanging tube having a plurality of extension portions and a plurality of connecting portions, wherein each of said connecting portions connects each two adjacent extension portions, each of said extension portions vertically extending in said heat exchanging compartment, said connecting portions being provided at said first portion of said energy efficient heat exchanger for connecting lower ends of said corresponding extension portions while said refrigerant collection pipe being provided at said second portion of said energy efficient heat exchanger for connecting upper ends of said corresponding extension portions.

2. A heat pump dryer, comprising:

a main casing having an air inlet, an air outlet, a heat exchanging compartment, a partitioning member provided in said heat exchanging compartment to divide said heat exchanging compartment into an air inlet channel and an air outlet channel, said air inlet channel communicating with said air inlet while said air outlet channel communicating with said air outlet, said air inlet channel communicating with said air outlet channel through an air passage formed in said heat exchanging compartment;

a plurality of connecting pipes for allowing heat exchange medium to pass therethrough;

a four-way reversing valve, said four-way reversing valve having first through fourth communicative ports, wherein said first communicative port selectively communicates with said second communicative port, while said third communicative port selectively communicating with said fourth communicative port;

a compressor having a compressor input port and a compressor output port;

a first heat exchanger connected to said compressor through at least one of said connecting pipes and said four-way reversing valve, said first heat exchanger having a first connection port and a second connection port, and is positioned in said air inlet channel; and a second heat exchanger connected to said compressor and said first heat exchanger through at least one of said connecting pipes and said four-way reversing valve, said second heat exchanger having a third connection port and a fourth connection port, and is positioned in said air outlet channel;

a fan provided in said air inlet channel;

an energy efficient heat exchanger provided in said heat exchanging compartment of said main casing, said energy efficient heat exchanger having a first portion partially exposed to said air inlet channel, and a second portion partially exposed to said air outlet channel;

a residual water discharge arrangement arranged to divert residual water formed on an external surface of the first heat exchanger, said residual water discharge arrangement comprising at least one of a guiding tube connected to a supporting boundary of said air inlet channel, and a residual water collection basin positioned under the first heat exchanger for collecting residual water from said first heat exchanger, an auxiliary heat exchanger having a fifth connection port and a sixth connection port, and an auxiliary fan provided in a vicinity of said auxiliary heat exchanger for supplying ambient air to said auxiliary heat exchanger, wherein air from a drying compartment is arranged to enter said air inlet channel through said air inlet to sequentially perform heat exchange with said first portion of said energy efficient heat exchanger and said first heat exchanger for extracting heat to said first portion of said energy efficient heat exchanger and said first heat exchanger, said air passing through said air inlet channel being arranged to enter said air outlet channel through said air passage and sequentially perform heat exchange with said second portion of said energy efficient heat exchanger and said second heat exchanger for absorbing heat from said second portion of said energy efficient heat exchanger and said second heat exchanger, said air in said air outlet channel being guided to flow out of said heat pump dryer through said air outlet, wherein a predetermined amount of refrigerant circulating in said energy efficient heat exchanger in such a manner that refrigerant circulating in said first portion is arranged to absorb heat from said air so as to become gaseous state and flow to said second portion where said refrigerant is arranged to release heat to said air and return to liquid state, wherein said main casing further has a receiving compartment, said heat exchanging compartment and said receiving compartment being arranged in a top-down configuration in which said heat exchanging compartment is provided above said receiving compartment, said first heat exchanger, said second heat exchanger, said fan, and said energy efficient heat exchanger being received in said heat exchanging compartment, said compressor and said four-way reversing valve being received in said receiving compartment, wherein said first connection port of said first heat exchanger is connected to said fourth connection port of said second heat exchanger and said fifth connection port of said auxiliary heat exchanger in a parallel configuration, said second connection port of said first heat exchanger being connected to said third communicative port said four-way reversing valve and said sixth connection port of said auxiliary heat exchanger.

3. The heat pump dryer, as recited in claim 2, wherein said third connection port of said second heat exchanger is connected to said first communicative port of said four-way reversing valve, while said fourth connection port of said second heat exchanger is connected to said first connection port of said first heat exchanger and said fifth connection port of said auxiliary heat exchanger, said second heat exchanger.

4. The heat pump dryer, as recited in claim 3, further comprising a first flow regulator and a second flow regulator, wherein said first flow regulator is arranged to connect between said fourth connection port and said first connection port, while said second flow regulator is connected between said fourth connection port and said fifth connection port of said auxiliary heat exchanger.

5. The heat pump dryer, as recited in claim 4, wherein in a cooling mode, said four-way reversing valve is switched so that said first communicative port communicates with said fourth communicative port while the second communicative port communicates with said third communicative port, such that said refrigerant is arranged to sequentially flow from said compressor to said second communicative port, said third communicative port, and said auxiliary heat exchanger.

6. A heat pump dryer, comprising:

a main casing having an air inlet, an air outlet, a heat exchanging compartment, a partitioning member provided in said heat exchanging compartment to divide said heat exchanging compartment into an air inlet channel and an air outlet channel, said air inlet channel communicating with said air inlet while said air outlet channel communicating with said air outlet, said air inlet channel communicating with said air outlet channel through an air passage formed in said heat exchanging compartment;

a plurality of connecting pipes for allowing heat exchange medium to pass therethrough;

a four-way reversing valve, said four-way reversing valve having first through fourth communicative ports, wherein said first communicative port selectively communicates with said second communicative port, while said third communicative port selectively communicating with said fourth communicative port;

a compressor having a compressor input port and a compressor output port;

a first heat exchanger connected to said compressor through at least one of said connecting pipes and said four-way reversing valve, said first heat exchanger having a first connection port and a second connection port, and is positioned in said air inlet channel; and a second heat exchanger connected to said compressor and said first heat exchanger through at least one of said connecting pipes and said four-way reversing valve, said second heat exchanger having a third connection port and a fourth connection port, and is positioned in said air outlet channel;

a fan provided in said air inlet channel, and an energy efficient heat exchanger provided in said heat exchanging compartment of said main casing, said energy efficient heat exchanger having a first portion partially exposed to said air inlet channel, and a second portion partially exposed to said air outlet channel;

a residual water discharge arrangement arranged to divert residual water formed on an external surface of the first heat exchanger, wherein said residual water discharge arrangement comprising at least one of a guiding tube connected to a supporting boundary of said air inlet channel, and a residual water collection basin positioned under the first heat exchanger for collecting residual water from said first heat exchanger, an auxiliary heat exchanger having a fifth connection port and a sixth connection port, and an auxiliary fan provided in a vicinity of said auxiliary heat exchanger for supplying ambient air to said auxiliary heat exchanger, and a first flow regulator connected between said fourth connection port of said second heat exchanger and said first connection port of said first heat exchanger, wherein air from a drying compartment is arranged to enter said air inlet channel through said air inlet to sequentially perform heat exchange with said first portion of said energy efficient heat exchanger and said first heat exchanger for extracting heat to said first portion of said energy efficient heat exchanger and said first heat exchanger, said air passing through said air inlet channel being arranged to enter said air outlet channel through said air passage and sequentially perform heat exchange with said second portion of said energy efficient heat exchanger and said second heat exchanger for absorbing heat from said second portion of said energy efficient heat exchanger and said second heat exchanger, said air in said air outlet channel being guided to flow out of said heat pump dryer through said air outlet, a predetermined amount of refrigerant circulating in said energy efficient heat exchanger in such a manner that refrigerant circulating in said first portion is arranged to absorb heat from said air so as to become gaseous state and flow to the second portion where said refrigerant is arranged to release heat to said air and return to liquid state, wherein said main casing further has a receiving compartment, said heat exchanging compartment and said receiving compartment being arranged in a top-down configuration in which said heat exchanging compartment is provided above said receiving compartment, said first heat exchanger, said second heat exchanger, said fan, and said energy efficient heat exchanger being received in said heat exchanging compartment, said compressor and said four-way reversing valve being received in said receiving compartment, wherein said compressor output port of said compressor is connected to said second communicative port, while said compressor input port of said compressor is connected to said fourth communicative port of said four-way reversing valve, wherein said first connection port of said first heat exchanger is connected to said fourth connection port of said second heat exchanger, said second connection port of said first heat exchanger being connected to said third communicative port of said four-way reversing valve, said first heat exchanger being positioned in said air inlet channel in such a manner that incoming air from said air inlet is arranged to first pass through said first portion of said energy efficient heat exchanger before reaching said first heat exchanger, wherein said first connection port of said first heat exchanger is connected to said fourth connection port of said second heat exchanger, said second connection port of said first heat exchanger being connected to said third communicative port of said four-way reversing valve through an electromagnetic valve, and said fifth connection port of said auxiliary heat exchanger in a parallel configuration, said sixth connection port of said auxiliary heat exchanger being further connected to said third communicative port of said four-way reversing valve.

7. The heat pump dryer, as recited in claim 6, wherein in a drying mode, said electromagnetic valve and said first flow regulator are opened such that refrigerant is arranged to sequentially flow from said compressor to said second communicative port, said first communicative port, said second heat exchanger, said first flow regulator, said first heat exchanger, said electromagnetic valve, said third communicative port, said fourth communicative port and eventually go back to said compressor.

8. The heat pump dryer, as recited in claim 6, wherein in a heating mode, said first flow regulator is selectively opened and said electromagnetic valve is selectively closed, such that said refrigerant is arranged to sequentially flow from said compressor to said second communicative port, said first communicative port, said second heat exchanger, said auxiliary heat exchanger, said third communicative port, said fourth communicative port and eventually go back to said compressor.

9. The heat pump dryer, as recited in claim 6, wherein in a cooling mode, said electromagnetic valve is closed and said four-way reversing valve is switched so that said first communicative port is connected to said fourth communicative port while said second communicative port is connected to said third communicative port, such that refrigerant is arranged to sequentially flow from said compressor to said second communicative port, said third communicative port, said auxiliary heat exchanger, said first heat exchanger, said second heat exchanger, said third connection port, said fourth communicative port and go back to said compressor.

* * * * *